United States Patent
Itamar et al.

(10) Patent No.: US 10,657,275 B2
(45) Date of Patent: May 19, 2020

(54) ENCRYPTION DIRECTED DATABASE MANAGEMENT SYSTEM AND METHOD

(71) Applicant: K2VIEW LTD, Nesher (IL)

(72) Inventors: Einav Itamar, Naharia (IL); Achi Rotem, Nesher (IL)

(73) Assignee: K2VIEW LTD, Nesher (IL)

( * ) Notice: Subject to any disclaimer, the term of this patent is extended or adjusted under 35 U.S.C. 154(b) by 170 days.

(21) Appl. No.: 15/570,775

(22) PCT Filed: Jun. 2, 2015

(86) PCT No.: PCT/IL2015/050564
§ 371 (c)(1),
(2) Date: Oct. 31, 2017

(87) PCT Pub. No.: WO2016/193962
PCT Pub. Date: Dec. 8, 2016

(65) Prior Publication Data
US 2018/0123790 A1    May 3, 2018

(51) Int. Cl.
*G06F 21/62* (2013.01)
*H04L 9/08* (2006.01)
(Continued)

(52) U.S. Cl.
CPC ...... *G06F 21/6218* (2013.01); *G06F 21/6227* (2013.01); *H04L 9/088* (2013.01);
(Continued)

(58) Field of Classification Search
CPC ................................................. G06F 21/6218
See application file for complete search history.

(56) References Cited

U.S. PATENT DOCUMENTS 5,303,367 A * 4/1994 Leenstra, Sr. ....... G06F 16/9024
5,510,979 A * 4/1996 Moderi ................ G06Q 20/202
235/377
(Continued)

FOREIGN PATENT DOCUMENTS

CN    102891876    1/2013

OTHER PUBLICATIONS

Lin, "Dynamic key management scheme for access control in a hierarchy", Computer Communications, Dec. 1997, pp. 1381-1385, vol. 20, No. 15, Elsevier Science Publishers BV, Amsterdam, NL.
(Continued)

*Primary Examiner* — Bradley W Holder
(74) *Attorney, Agent, or Firm* — Wilmer Cutler Pickering Hale and Dorr LLP

(57) ABSTRACT

A granular encryption database management system characterized by hierarchical internal key management using asymmetric encryption of the user's keys, which are stored within a (local) encryption key table. Data is encrypted, decrypted, stored, and accessed from rows within the database (hereinafter 'instances'). Instances are ordered in categories called Types. Instances are encrypted with Instance keys. All instances of the same type have their Instance keys generated by means of a hash function of their common Type's key, while Type keys are generated from the key of the higher category which is often the Master key of the whole system.

33 Claims, 7 Drawing Sheets

(51) Int. Cl.
   *H04L 9/14* (2006.01)
   *H04L 9/30* (2006.01)
(52) U.S. Cl.
   CPC .......... *H04L 9/0825* (2013.01); *H04L 9/0836* (2013.01); *H04L 9/0894* (2013.01); *H04L 9/14* (2013.01); *H04L 9/30* (2013.01)

(56) References Cited

U.S. PATENT DOCUMENTS

| | | | | |
|---|---|---|---|---|
| 5,787,169 A * | 7/1998 | Eldridge | ................ | G06F 21/40 380/286 |
| 5,796,839 A * | 8/1998 | Ishiguro | ........... | G11B 20/00086 380/44 |
| 5,857,023 A * | 1/1999 | Demers | ................ | G06Q 20/02 705/39 |
| 6,148,342 A * | 11/2000 | Ho | ..................... | G06F 21/6245 709/223 |
| 6,307,936 B1 | 10/2001 | Ober et al. | | |
| 6,405,198 B1 * | 6/2002 | Bitar | ................ | G06F 16/2282 |
| 6,711,677 B1 * | 3/2004 | Wiegley | ................ | H04L 9/3236 713/151 |
| 6,735,313 B1 * | 5/2004 | Bleichenbacher | ..... | H04H 60/23 348/E7.056 |
| 7,526,487 B1 * | 4/2009 | Bobbitt | ................ | G06Q 10/10 |
| 8,117,464 B1 * | 2/2012 | Kogelnik | ........... | H04L 63/0428 713/193 |
| 2002/0147736 A1 * | 10/2002 | Isip, Jr. | ............... | G06F 16/2282 |
| 2006/0288232 A1 * | 12/2006 | Ho | ..................... | G06F 21/6227 713/185 |
| 2007/0079119 A1 * | 4/2007 | Mattsson | ............... | G06F 21/602 713/164 |
| 2008/0077806 A1 * | 3/2008 | Cui | ..................... | G06F 21/6227 713/193 |
| 2008/0133935 A1 * | 6/2008 | Elovici | ............... | G06F 21/6227 713/193 |
| 2009/0106561 A1 | 4/2009 | Ejiri | | |
| 2009/0268903 A1 * | 10/2009 | Bojinov | ................ | G06F 3/0622 380/45 |
| 2009/0319772 A1 * | 12/2009 | Singh | ................. | G06F 21/6218 713/153 |
| 2010/0246827 A1 * | 9/2010 | Lauter | ................ | G06F 21/6209 380/278 |
| 2011/0035581 A1 * | 2/2011 | Maller | ................... | G06Q 10/10 713/152 |
| 2012/0066490 A1 * | 3/2012 | Sato | ........................ | G06F 21/72 713/153 |
| 2013/0067547 A1 * | 3/2013 | Thavasi | ................. | G06F 21/31 726/7 |

OTHER PUBLICATIONS

European Search Report App. No. 15894048.6-1218 / 3304405, 9 pages, dated Dec. 6, 2018.
White Paper: SafeNet DataSecure vs. Native SQL Server Encryption, SafeNet, pp. 1-15.
International Search Report PCT/IL2015/050564 completed Oct. 6, 2015; dated Oct. 8, 2015 3 pages.
Written Opinion of the International Searching Authority PCT/IL2015/050564 dated Oct. 8, 2015 3 pages.

* cited by examiner

| Mortgage TABLE/DB | | | |
|---|---|---|---|
| CID | Last Name | First Name | Mortgage Due... |
| 1 | Doe | John | $#dfjh423 |
| 2 | Roe | Jane | $#dopf4gr |
| ... | | | |

| Encryption key table | |
|---|---|
| Database admin | Encrypted keys |
| Admin 1 | q7e345632 |
| Admin 2 | kerq14879 |

Fig. 1

| User name | Private key | Public key | Encryption keys |
|---|---|---|---|
| John Doe | #hjcf2515 | 123547dvd | Smgio4w90; |
| Jane Doe | %ld5489 | 13297bvb | Asbjh37456;<br>Aigfhjdf55fr; |
| | | | |

Fig. 3

ENCRYPTION DIRECTED DATABASE MANAGEMENT SYSTEM AND METHOD

This application is a National Phase of PCT Patent Application No. PCT/IL2015/050564 having International filing date of Jun. 2, 2015. The contents of the above applications are all incorporated by reference as if fully set forth herein in their entirety.

FIELD OF THE INVENTION

The present invention relates to the field of database management systems and more particularly database management systems and methods directed towards content encryption.

BACKGROUND OF THE INVENTION

Today, many organizations store their data in organization-wide databases. Often, the data stored is very sensitive and may contain commercial secrets, costumers' personal data, or otherwise sensitive data which may cause serious damage to the organization if leaked.

The danger of data leakage grows where the organization has geographically separate offices that connect to the organization's database with the use of regular internet infrastructure.

To mitigate the risk for compromising sensitive data, amongst various data security provisions, many organizations encrypt their databases using encryption-directed database management systems. Such systems enable the organization to encrypt and decrypt the data with the use of various known algorithms.

In most encryption methods, secret keys are used to decrypt and access the encrypted data. The database management systems enable the creation, storage, retrieval and security of the keys which serve for encryption of all data within the encrypted database.

Internal Vs. External Encryption Key Management Systems

Different database management systems manage their keys in different ways. Key management using only the server of the encrypted database itself is called internal key management, while key management using a dedicated external key management server is called external key management.

Various internal key management modules handle the keys in different ways. The keys are usually stored in a separate table within the administrative database within the server of the encrypted database. Some methods and systems allow users to simply access their keys, others encrypt the key table with a single master key, while others perform key operations through a proxy.

Internal key management is simple and doesn't require an external server, driving down operation costs. Nevertheless, there are drawbacks to internal key management: (a) database administrators have access to the whole key table thus the whole system is vulnerable at the level of the individual system administrator; (b) upon database breach, the trespasser may easily gain access to the whole key table by hacking the master key of the encrypted key table, or otherwise by sniffing the various keys being used outside the encrypted key table.

External key management is often considered safer than internal key management, since such systems use separate dedicated servers and prevent any association of the keys with the encrypted database, thus also preventing access to the keys by system administrators. The requirement of a second dedicated server however may prove problematic; for example, outsourcing the key server responsibilities to third parties suffers from frequently unknown reliability levels.

Granularity

Another shortcoming in known systems involves the granularity of the table encryption. Certain methods (e.g., transparent encryption in MSSQL) allow the encryption of entire tables within the database while other methods (e.g., granular encryption in MSSQL) allow the encryption of specific fields or columns thereof. One must trade off security for simplicity; it is simpler when entire tables are encrypted and a minimal number of keys are created and managed, but more secure when every field is encrypted (generally requiring a dedicated key management system for effective management of the large number of keys).

As should be clear from the brief review above there is no system that combines granular encryption of the database with simple and straight forward key management. Such a system would ideally obviate the need for dedicated key management systems and further allow for internal management of a granularly encrypted database and its keys.

Permissions to Access Data

Another shortcoming in known systems involves permissions to access data in the database. In known systems, permissions are granted using a different process from the key granting process and from the decryption process. Permissions and encryption keys for accessing allowed data are accomplished separately.

Although the use of permissions has evolved naturally independent of issues of encryption, permissions still persist where encryption is required. For the sake of simplification there is a drive to provide a system that through encryption management, obviates the need for a separate permission system.

Background Synopsis

Therefore, there is a pressing need to provide an encryption directed database management system that allows:
(a) internal management of keys within the server of the encrypted database itself preventing costs and risks related to external key management;
(b) high security standards for the key table that is located within the database server, preventing server administrators from accessing the keys in the key table, and further having higher security than systems using a single master key for accessing a common key table;
(c) granular encryption of the database involving different keys for the columns and rows within; as mentioned above in this case if a certain encrypted field or row is compromised, data stored in fields and rows having a different key remain secure; and,
(d) obviating the need for a separate permission system through encryption management.

SUMMARY OF THE INVENTION

The present invention provides a granular encryption database management system characterized by hierarchical internal key management using asymmetric encryption of the user's keys, which are stored within a (local) encryption key table.

Data is encrypted, decrypted, stored, and accessed from rows within the database (hereinafter 'instances'). Instances are ordered in categories called Types.

Instances are encrypted with Instance keys. All instances of the same type have their Instance keys generated by means of a hash function of their common Type's key and their instance identifier, while Type keys are generated from the key of the higher category and their type identifier. The higher category key is often the Master key of the whole system.

The master key is preferably a random string of at least 256 bit length, which is generated during the system installation, based on the credentials of the system's super user.

The term 'master user' hereunder refers to a database user that has received access to a master key either by the system upon system installation, or otherwise by another master user using access granting method (see below).

The Type key is preferably a hash function of the Master key and the type's identifier, this being a necessarily unique identifier for the type and preferably comprising the string name of the type. For example: Type key=Hash[Master key, str(type_name)].

Similarly, the Instance key is a hash function of the Type key and the Instance's identifier. The Instance identifier is a unique identifier for an instance and preferably comprises the serial number of the instance. For example: Instance key=Hash[Type key, ID(instance)].

The system provides a method for hierarchical and granular database encryption that comprises the following steps:
  (a) Upon system installation, the system generates a master key. This step is done concurrently with the creation of the first system user, since each key is encrypted based on its owner's password (see below).
  (b) Upon creation of a type within the database for administration of individual instances, a Type key is generated from the Master key and the Type identifier by means of (for example) a hash function of these two values.
  (c) Upon creation of an instance of a type for data storage, an Instance key is generated (e.g. hashed) from the Type key and the Instance identifier.

The encryption key table lists users in rows while having a list of columns for every user that is comprised of: a plurality of encryption key columns ('wallet'), private key column and public key column. It is to be mentioned that users' passwords may be managed by any means such as, external services, or encrypted and stored in a column in the encryption key table.

The present invention further provides a method for new user registration with the system:
  (a) Upon user registration, the user chooses a password.
  (b) Password is stored.
  (c) The system generates a public/private key pair for said user.
  (d) The public/private key pair is stored within the encryption key table.
  (e) The private key is encrypted using the user's password as a passphrase (key) for the encryption.
  (f) If user is a 'first user' (or 'super user'), then system generates the Master key and stores it in said user's wallet and encrypts it with said user's public key.

The present invention further provides a method for a master user to grant access to a type for grantee system users:
  (a) Master user decrypts his Private key with His password.
  (b) Master user decrypts his Master key with His Private key.
  (c) Master user hashes the Type key for the Type with the Master key and the Type identifier (e.g., string of the type name).
  (d) Master user encrypts the type key with the grantee user's public key.
  (e) Master user stores the encrypted Type key in the grantee's wallet.

The present invention further provides a method for granting permission access to an instance through key granting for grantee system users:
  (a) Grantor decrypts his Private key with his password.
  (b) Grantor decrypts his key with his Private key.
  (c) if key is a Master key, grantor hashes a Type key for the instance with the
  Master key and the Type identifier
  (d) Grantor hashes the Instance key for the Instance with the Type key and the Instance identifier (e.g., instance's serial number).
  (e) Grantor stores the Instance key in the grantee's wallet.
  (f) Grantor encrypts the stored Instance key with the grantee's public key.

It is to be mentioned that for the method of granting access to an instance, the grantor must either be granted access to a type key, or to have access to the master key (as a master user) and then generate the type key from the master key.

As was described above, the present invention holds many advantages over known systems and methods, and amongst others, provides an encryption directed database management system that allows:
  (a) internal management of keys within the server of the encrypted database itself preventing costs and risks related to external key management;
  (b) highly secure key table that is located within the database server, preventing server administrators from accessing the keys in the key table, and further having higher security standards than having a single master key for accessing the key table;
  (c) granular encryption of the database involving multitude of different keys for the cells within, whereby if a certain encrypted cell is compromised, the sensitive data stored within the fields and rows having a different key, remains secure; and
  (d) through encryption management, obviating the need for a separate permission system.

BRIEF DESCRIPTION OF THE DRAWINGS

Embodiments and features of the present invention are described herein in conjunction with the following drawings:

FIG. 1 is a simplified depiction of a database managed by a system consistent with current practice;

FIG. 3 is a simplified depiction an encryption key table consistent with the invention;

It should be understood that the drawings are not necessarily drawn to scale.

DETAILED DESCRIPTION OF PREFERRED EMBODIMENTS

FIG. 1 illustrates a simple mortgage table within a bank database, and an encryption key table. The mortgage column contains sensitive data and therefore is stored in encrypted form within the table. For the purposes of this example consider the bank uses a simple internal key management system, whereby the keys are stored and managed in a table on the database server. The keys are further encrypted by a master key stored so as to be accessible to authorized bank personnel.

As an example transaction of how many current systems work, we take the case that Admin 1, a bank functionary, inputs a query involving the mortgage of Mr. John Doe.

To access the data requested, admin 1 inputs the key for decrypting his encryption key while also unintentionally decrypting admin 2 keys. The system decrypts the requested data but also allows Admin 1 to decrypt information of admin 2, such as Ms. Roe's data.

Although the above is an overly simplified illustration, it shows how many existing systems, even such of much higher complexity, suffer from crucial security flaws whereby a user gains the means to decrypt an entire table (or even the entire database) when he actually needed only to access one piece of information. In this case, the database permission system allows admin 1 to access only allowed data. If a trespasser gains access to the encryption key, he will not be affected by the permission system and will gain access to the whole database.

Figure 2:
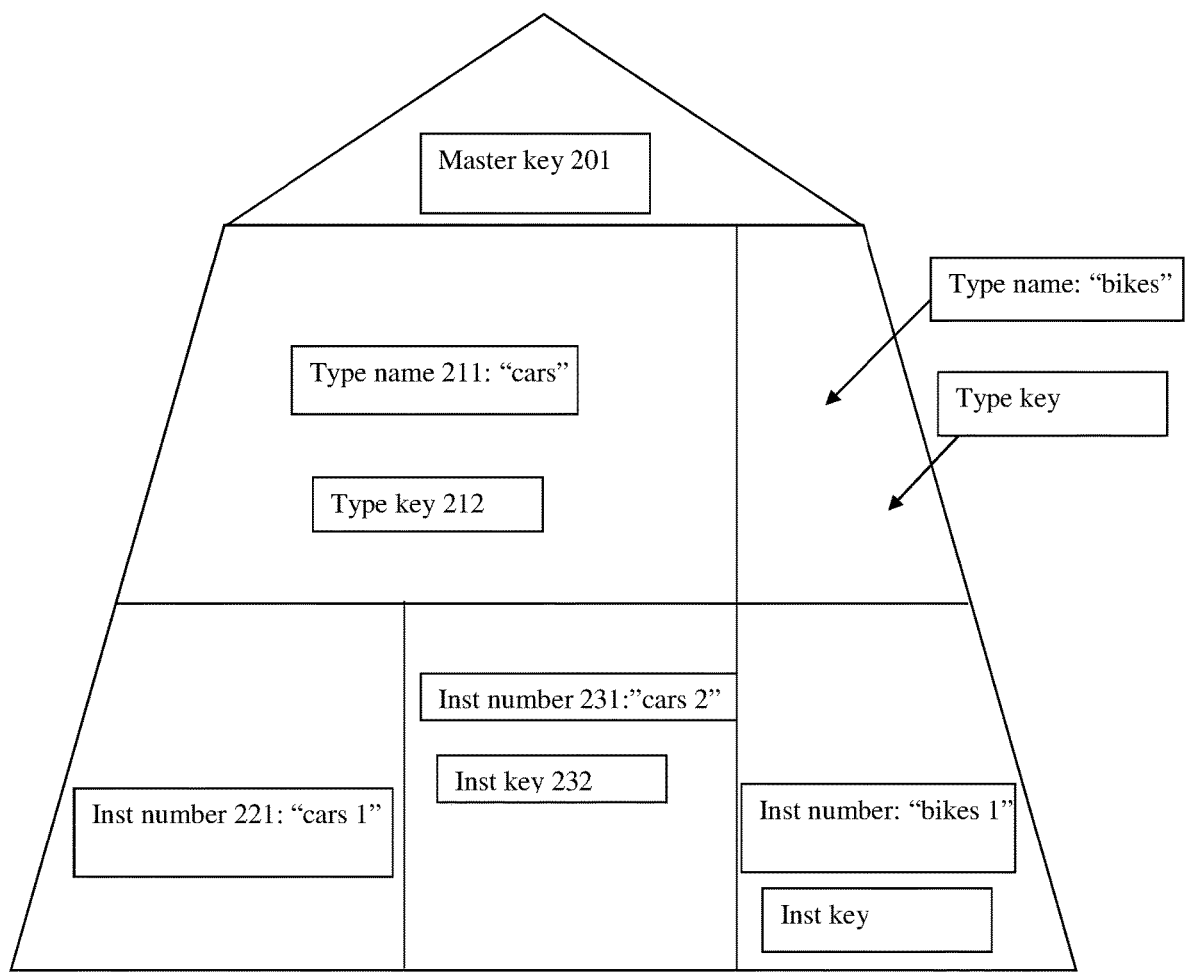
FIG. 2 is an illustration of the granular hierarchical character of a system consistent with the invention.

Referring to FIG. 2. The master key 201 is a random string of at least 256 bit length. It holds all access to the database since all other keys are hashed from the Master key.

The Type key 212 is a hash function output of the Master key 201 and the type's identifier. The type's identifier is a unique identifier of the type and preferably the string name of the type 211. For example: Type key=Hash[Master key 201, str("cars" 211)].

The Instance key 222 is a hash function output of the Type key 212 and the Instance's identifier. The Instance identifier is a unique identifier of the instance and preferably the serial number of the instance. For example: Instance key=Hash [Type key 212, Num("1" 221)].

Referring to FIG. 3. The encryption key table lists users in rows while having a list of columns for every user that is comprised of: a plurality of encryption key columns ('wallet'), private key column, public key column.

Figure 4:
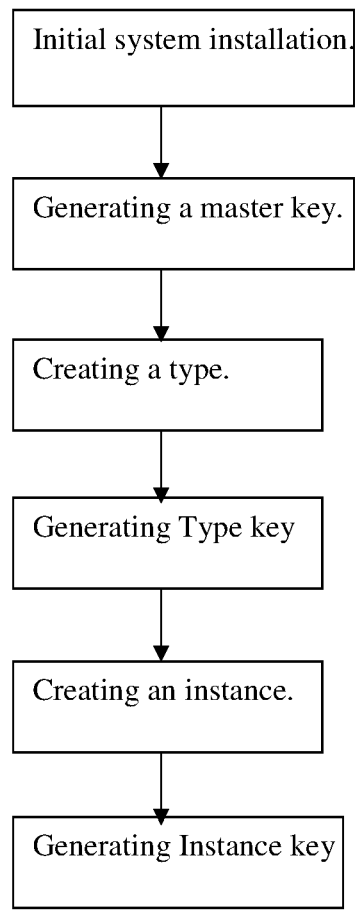
FIG. 4 is a block diagram depicting a method for hierarchical and granular database encryption consistent with one embodiment of the invention.

Referring to FIG. 4. The system provides a method for hierarchical and granular database encryption that is comprised of the following steps:
(a) Upon initial system installation, the system generates a master key.
(b) Upon creation of a type within the database for administration of individual instances, a Type key is generated (hashed) from the Master key and the Type identifier.
(c) Upon creation of an instance within a type for data storage, an Instance key is generated (hashed) from the Type key and the Instance identifier.

Figure 5:
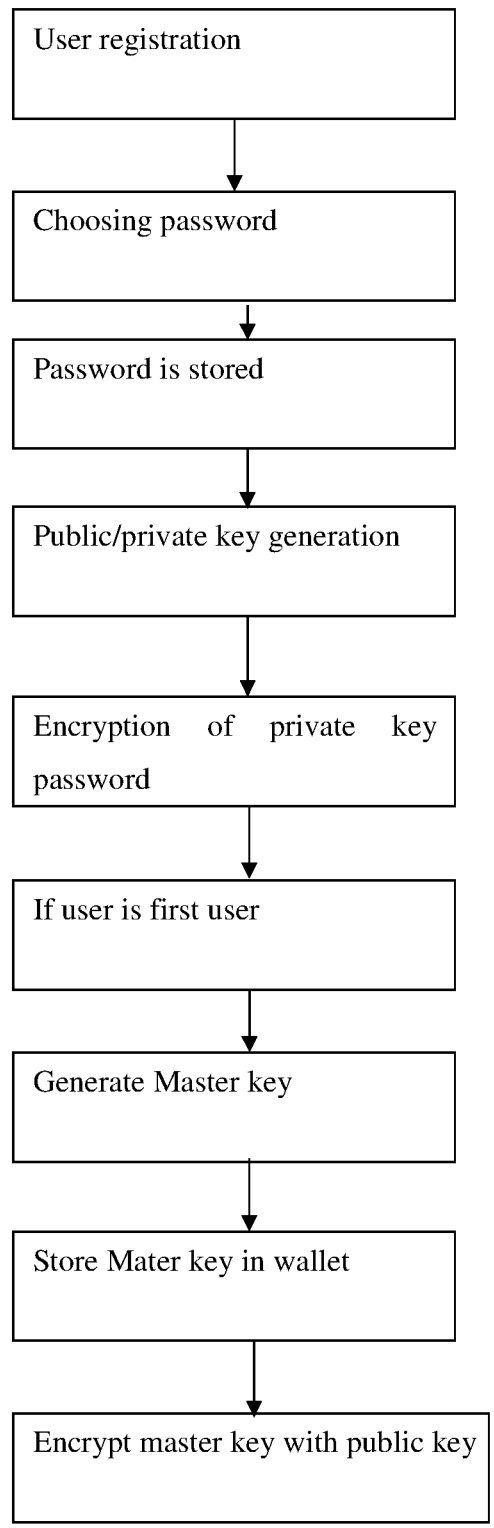
FIG. 5 is a block diagram depicting a method for new user registration with a system consistent with one embodiment of the invention.

Referring to FIG. 5. The present invention further provides a method for new user registration with the system:
(a) Upon user registration, the user chooses a password.
(b) Password is stored.
(c) The system generates a public/private key pair for said user.
(d) The public/private key pair is stored within the encryption key table.
(e) The private key is encrypted using the user's password as a passphrase (key) for the encryption.
(f) If user is first user, system generates the Master key and stores it in said user's wallet and encrypts it with said user's public key.

Figure 6:
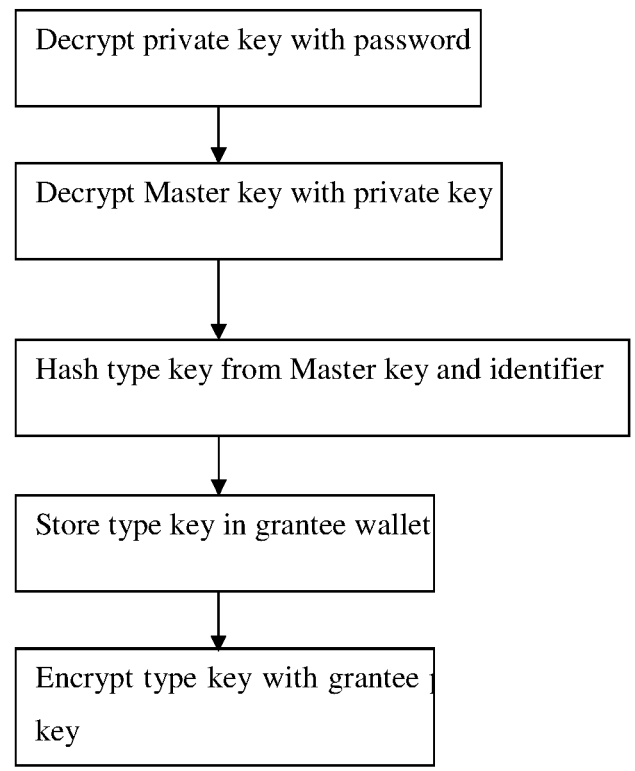
FIG. 6 is a block diagram depicting a method for granting access to a type for other users in a system consistent with one embodiment of the invention.

Referring to FIG. 6. The present invention further provides a method for a master user to grant access to a type for grantee system users:
(a) Master user decrypts his Private key with His password.
(b) Master user decrypts his Master key with His Private key.
(c) Master user hashes the Type key for the Type with the Master key and the Type identifier (e.g., string of the type name).
(d) Master user stores the Type key in the grantee's wallet.
(e) Master user encrypts the stored type key with the grantee user's public key.

Figure 7:
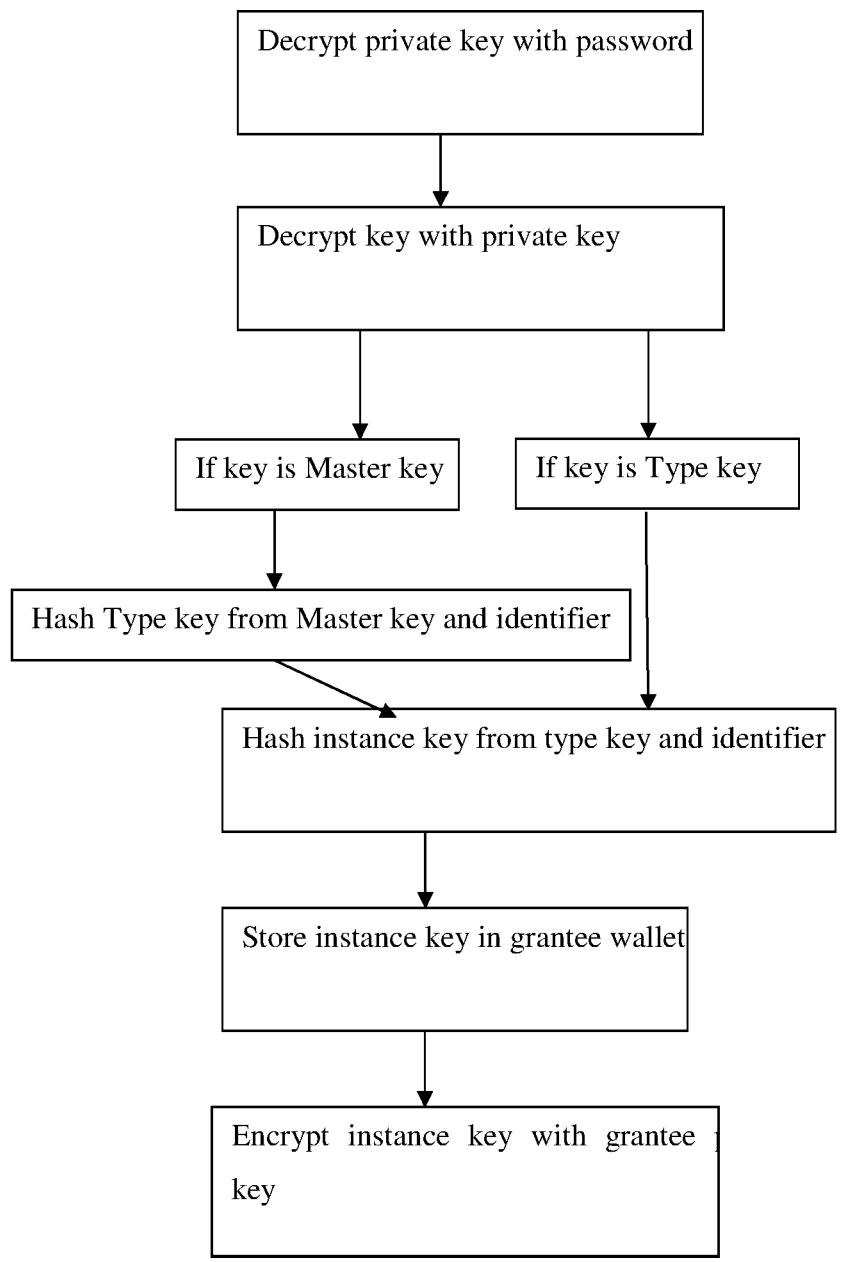
FIG. 7 is a block diagram depicting a method for granting access to an instance for other users in a system consistent with one embodiment of the invention.

Referring to FIG. 7. The present invention further provides a method for granting permission access to an instance through key granting for grantee system users:
(a) Grantor decrypts his Private key with His password.
(b) Grantor decrypts his key with His Private key.
(c) If grantor's key is a Master key, grantor hashes a Type key for the instance with the Master key and the Type identifier.
(d) Grantor hashes the Instance key for the Instance with the Type key and the Instance identifier (e.g., instance's serial number).
(e) Grantor stores the Instance key in the grantee's wallet.
(f) Grantor encrypts the stored Instance key with the grantee's public key.

The present invention will be understood from the following detailed description of preferred embodiments, which are meant to be descriptive and not limiting. For the sake of brevity, some well-known features, methods, systems, procedures, components, circuits, and so on, are not described in detail.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

The invention claimed is:

1. A non-transitory computer-readable medium containing instructions that cause hardware logic to perform operations for controlling a database, comprising, by the hardware logic:
generating a higher category key;
upon creation of a type within the database for administration of individual instances of the database, generating a type key by hashing the higher category key and a type identifier identifying the type; and
upon creation of an instance within the type for data storage, generating an instance key by hashing the type key and an instance identifier identifying the instance,
wherein the instance key is used to encrypt and decrypt data stored in the instance.

2. The non-transitory computer-readable medium as claimed in claim 1, wherein the higher category key is a master key.

3. The non-transitory computer-readable medium as claimed in claim 2, wherein the master key is generated upon system installation.

4. A non-transitory computer-readable medium containing instructions that cause hardware logic to perform operations for user registration in a database, comprising, by the hardware logic:
storing a password of a user;
storing a public key and an encrypted private key of the user within an encryption key table,
wherein the private key is encrypted by using the password of the user as a key for the encryption; and
if the user has a predetermined authorization, generating a higher category key and storing the higher category key, in encrypted form, in a portion of the encryption key table corresponding to the user,
wherein the higher category key is encrypted with the public key of the user; and
wherein the higher category key enables the user having the predetermined authorization to access the database.

5. The non-transitory computer-readable medium as claimed in claim 4, wherein the user having the predetermined authorization is a master user, and
wherein the higher category key is a master key.

6. A non-transitory computer-readable medium containing instructions that cause hardware logic to perform operations relating to a grantor user granting, to a grantee user, access to a database, comprising, by the hardware logic:
decrypting a private key of the grantor user with a password of the grantor user;
decrypting a higher category key with the decrypted private key of the grantor user;
generating a type key by hashing the decrypted higher category key and a type identifier identifying a type of instances of the database; and
storing the type key, in encrypted form, in a portion of an encryption key table corresponding to the grantee user,
wherein the stored type key is encrypted with a public key of the grantee user.

7. The non-transitory computer-readable medium as claimed in claim 6, wherein the grantor user is a master user, and
wherein the higher category key is a master key.

8. The non-transitory computer-readable medium as claimed in the claim 6, wherein the portion of an encryption key table storing the type key comprises a wallet of the grantee user.

9. A non-transitory computer-readable medium containing instructions that cause hardware logic to perform operations relating to a grantor user granting access, to a grantee user, to a database, comprising, by the hardware logic:
decrypting a private key of the grantor user with a password of the grantor user;
decrypting a particular key with the private key of the grantor user;
if the particular key is a higher category key:
generating a type key by hashing the decrypted higher category key and a type identifier identifying a type of instances of the database, and
generating an instance key by hashing the type key and an instance identifier identifying a particular instance of the instances of the database;
if the particular key is the type key, generating the instance key by the type key and the instance identifier; and
storing the instance key, in encrypted form, in a portion of an encryption key table corresponding to the grantee user,
wherein the stored instance key is encrypted with a public key of the grantee user.

10. The non-transitory computer-readable medium as claimed in claim 9, wherein the grantor user is a master user, and
wherein the higher category key is a master key.

11. The non-transitory computer-readable medium as claimed in claim 9, wherein the portion of an encryption key table storing the instance key comprises a wallet of the grantee user.

12. A encryption database management system, comprising:
memory configured to store data in instances of a database, wherein different subsets of the instances are associated with different types based on the data stored in the instances, and wherein each instance has an instance identifier identifying the instance and each type has a type identifier identifying the type; and
hardware logic configured to:
obtain a higher category key,
generate a type key by utilizing the higher category key and a type identifier of a type, wherein the type is for administration of individual instances of the database, and
generate an instance key by utilizing the type key and an instance identifier of an instance, wherein the instance is associated with the type, and
use the instance key to encrypt and decrypt data stored in the instance.

13. The encryption database management system of claim 12, wherein the type key is generated upon creation of the type.

14. The encryption database management system of claim 12, wherein the instance key is generated upon creation of the instance.

15. The encryption database management system of claim 12, wherein the higher category key comprises a master key.

16. The encryption database management system of claim 12, wherein at least one of the instance key, the type key, and the higher category key is stored in an encryption key table.

17. The encryption database management system of claim 16, wherein the instance key, the type key, and the higher category key are stored in the encryption key table.

18. The encryption database management system of claim 16, wherein the hardware logic, memory, and the encryption key table are located within a server.

19. The encryption database management system of claim 12, wherein the hardware logic comprises at least one processor configured to execute instructions to generate the type key and the instance key.

20. The encryption database management system of claim 12, wherein the hardware logic is configured to:
generate the type key by hashing the higher category key and the type identifier of the type, and
generate the instance key by hashing the type key and the instance identifier of the instance.

21. A encryption database management system, comprising:
memory configured to store data in instances of a database, wherein different subsets of the instances are associated with different types based on the data stored in the instances, and wherein each instance has an instance identifier identifying the instance and each type has a type identifier identifying the type; and
hardware logic configured to:
store a password of a user;
store a public key and an encrypted private key of the user within an encryption key table, wherein the private key is encrypted by using the password of the user as a key for the encryption; and
if the user has a predetermined authorization, generate a higher category key and store the higher category key, in encrypted form, in the encryption key table,
wherein the higher category key is encrypted with the public key of the user, and
wherein the higher category key enables the user having the predetermined authorization to access the database.

22. The encryption database management system as claimed in claim 21, wherein the public key and the private key are stored in a portion of the encryption key table associated with the user.

23. The encryption database management system as claimed in claim 21, wherein the public key, private key, and higher category key are stored in a portion of the encryption key table associated with the user.

24. The encryption database management system as claimed in claim 21, wherein the user having the predetermined authorization is a master user, and
wherein the higher category key is a master key.

25. The encryption database management system of claim 21, wherein the hardware logic, memory, and the encryption key table are located within a server.

26. A encryption database management system, comprising:
memory configured to store data in instances of a database, wherein different subsets of the instances are associated with different types based on the data stored in the instances, and wherein each instance has an instance identifier identifying the instance and each type has a type identifier identifying the type; and
hardware logic configured to:
decrypt a private key of a grantor user of the database with a password of the grantor user;
decrypt a higher category key with the decrypted private key of the grantor user;
generate a type key by utilizing the decrypted higher category key and a type identifier identifying a type of an instance of the database,
store the type key, in encrypted form, in a portion of an encryption key table corresponding to a grantee user, wherein the stored type key is encrypted with a public key of the grantee user.

27. The encryption database management system of claim 26, wherein generating the type key based on the higher category key and the type identifier comprises generating the type key by hashing the higher category key and the type identifier.

28. The encryption database management system of claim 26, wherein the grantor user is a master user, and
wherein the higher category key is a master key.

29. The encryption database management system of claim 26, wherein the hardware logic, memory, and the encryption key table are located within a server.

30. A encryption database management system, comprising:
memory configured to store data in instances of a database, wherein different subsets of the instances are associated with different types based on the data stored in the instances, and wherein each instance has an instance identifier identifying the instance and each type has a type identifier identifying the type; and
hardware logic configured to:
decrypt a private key of a grantor user of the database with a password of the grantor user;
decrypt a particular key with the private key of the grantor user;
if the particular key is a higher category key:
generate a type key by utilizing the decrypted higher category key and a type identifier identifying a type of the instances of the database, and
generate an instance key by utilizing the type key and an instance identifier identifying a particular instance of the instances of the database;
if the particular key is the type key, generate the instance key for the particular instance by utilizing the type key and the instance identifier;
store the instance key, in encrypted form, in a portion of an encryption key table corresponding to the grantee user, wherein the stored instance key is encrypted with a public key of the grantee user.

31. The encryption database management system of claim 30, wherein the type key is generated by hashing the type key from the higher category key and the type identifier, and
wherein the instance key is generated by hashing the instance key from the type key and the instance identifier.

32. The encryption database management system as claimed in claim 30, wherein the grantor user is a master user, and
wherein the higher category key is a master key.

33. The encryption database management system of claim 30, wherein the hardware logic, memory, and the encryption key table are located within a server.

* * * * *